United States Patent [19]

Kolacz

[11] 4,303,151
[45] Dec. 1, 1981

[54] POSITIVE LOCKING SHIFT COUPLER

[75] Inventor: Ferdynand Kolacz, New Berlin, Wis.

[73] Assignee: Allis-Chalmers Corporation, Milwaukee, Wis.

[21] Appl. No.: 104,005

[22] Filed: Dec. 17, 1979

[51] Int. Cl.³ .................. F16D 13/60; F16D 21/04
[52] U.S. Cl. ........................... 192/114 R; 192/48.91
[58] Field of Search ............ 192/114 R, 48.91, 67 R

[56] References Cited

U.S. PATENT DOCUMENTS

| | | | |
|---|---|---|---|
| 1,935,234 | 11/1933 | White | 192/114 R |
| 2,459,361 | 1/1949 | Carnagua et al. | 192/48.91 |
| 2,735,528 | 2/1956 | Dodge | 192/67 R |
| 2,883,020 | 4/1959 | Kummich et al. | 192/114 R |
| 4,098,380 | 7/1978 | Thomas | 192/48.91 |

Primary Examiner—George H. Krizmanich
Attorney, Agent, or Firm—Arthur L. Nelson

[57] ABSTRACT

A positive locking mechanism on a shift coupler for a vehicle transmission. The locking mechanism includes a locking ring on the clutch collar. A sleeve is formed with radial openings for receiving balls which lock the clutch sleeve and clutch hub in the shifted position and retaining this position until manually released.

10 Claims, 5 Drawing Figures

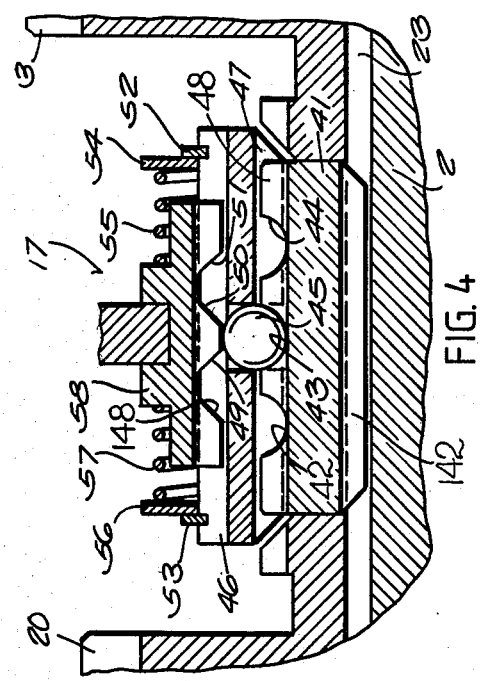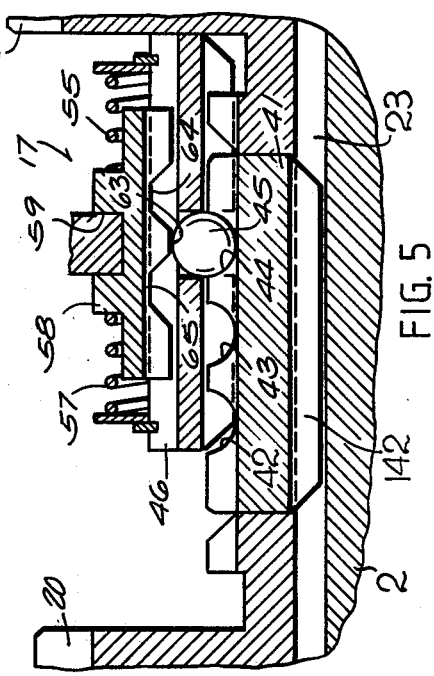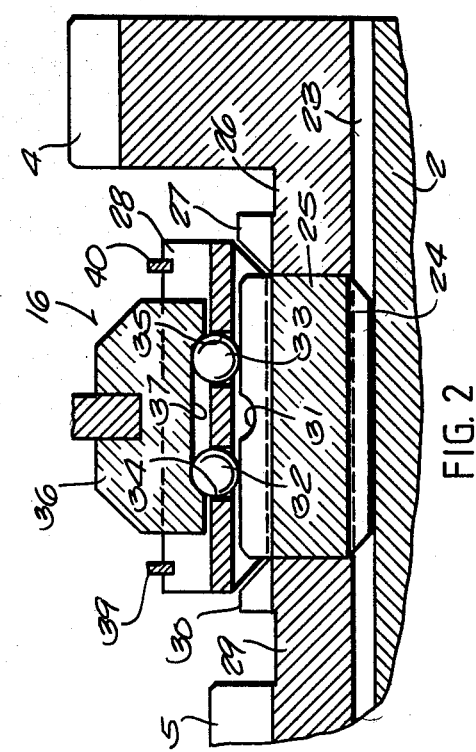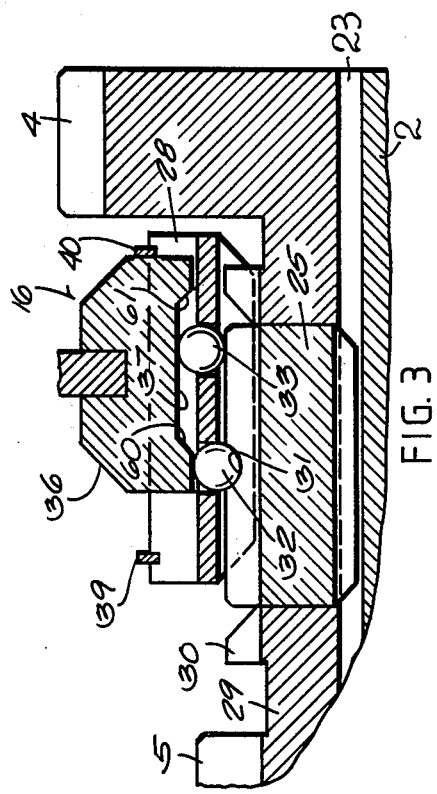

POSITIVE LOCKING SHIFT COUPLER

This invention relates to a transmission clutch, and more particularly to a positive locking device with a transmission clutch for locking the transmission clutch after the clutch has been shifted.

Vehicle transmissions are primarily used for driving the vehicle at a predetermined speed ratio selected on the transmission. The engine and transmission of the vehicle can also be used for breaking of the vehicle, particularly when the vehicle is coasting down hill. To assure continuity of drive or breaking it is important that the transmission remain in gear. Accordingly, this invention provides a locking device on the transmission clutch to maintain the transmission in the selected gear ratio until the operator of the vehicle shifts the transmission.

It is an object of this invention to lock the vehicle transmission in the shifted position.

It is another object of this invention to provide a vehicle clutch for shifting the transmission, and a locking device for locking the vehicle transmission in the selected position.

It is a further object of this invention to provide a manually operated clutch to shift the vehicle transmission, and a locking device to lock the clutch in or out of gear whereby the clutch can be shifted only by a manual control.

The objects of this invention may be accomplished in a transmission having gears rotatably mounted on a shaft and a clutch sleeve slideably mounted on clutch hub fixed to said shaft. The clutch sleeve is manually shiftable to selectively engage either of said gears with the clutch sleeve on a shaft to drive the transmission at selected gear ratios. The locking device includes a locking ring positioned on the clutch sleeve with radial holes receiving locking elements which are operated by ramps on the locking ring to selectively bias the locking elements to lock the clutch sleeve and the clutch hub in fixed position relative to each other to prevent the transmission from shifting out of gear once a shift position is selected by the operator.

Referring to the drawings:

FIG. 2 is a cross-section view of an embodiment of the invention showing the clutch in the neutral position;

FIG. 3 is a cross-section view of the embodiment shown in FIG. 2 in which the clutch is shifted to the engaged position and locked by the locking device;

FIG. 4 is a cross-section view of another embodiment of the invention showing the clutch in the neutral position;

FIG. 5 is a cross-section view of the device shown in FIG. 4 in which the clutch is shifted to the engaged position and the locking device locks the clutch in the position.

Figure 1:
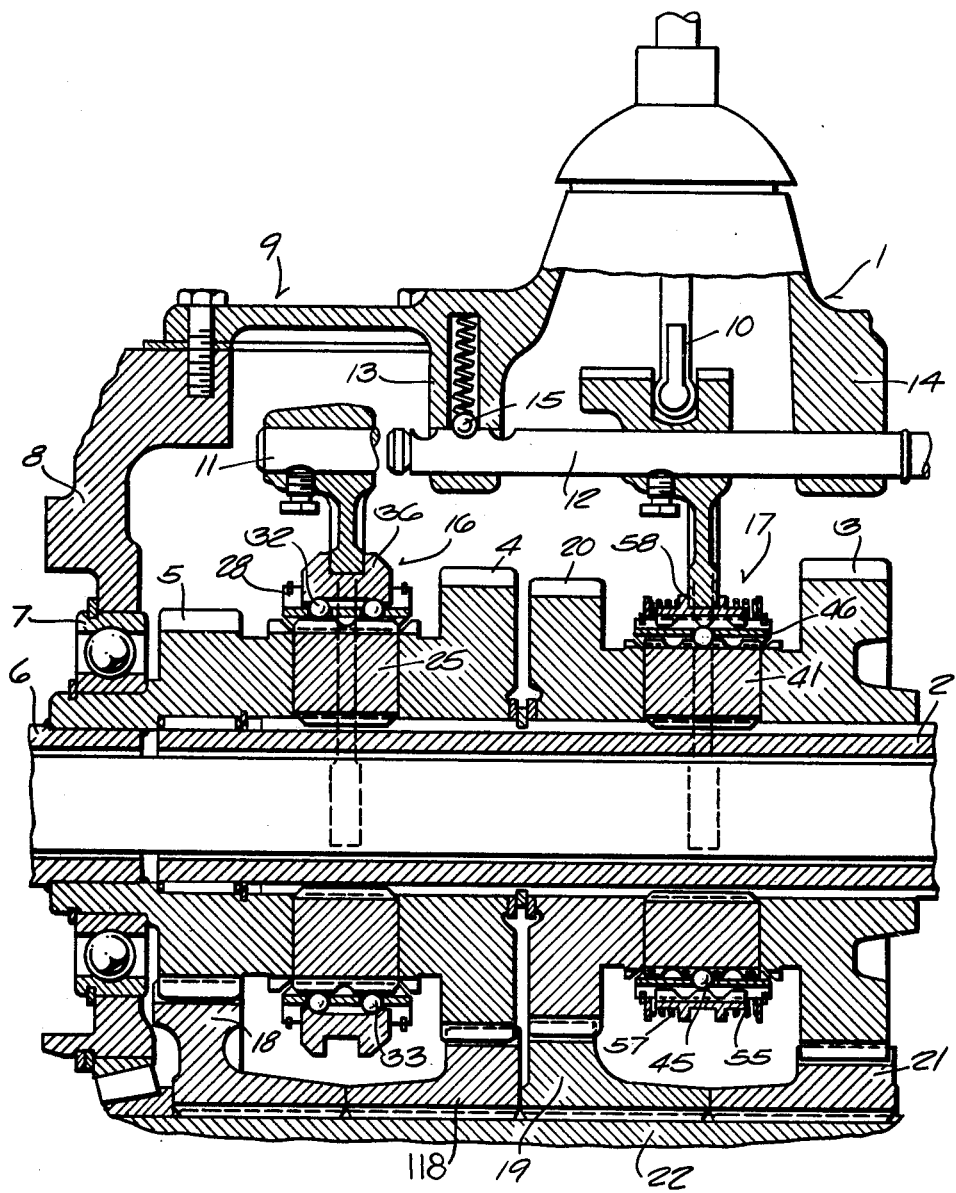
FIG. 1 illustrates a cross-section view of the transmission clutches and locking devices in a transmission.

FIG. 1 shows, a cross-section view of the transmission. A transmission 1 includes a quill shaft 2 rotatably mounted for supporting gears 3, 20, 4, and 5. Gear 5 is welded to quill shaft 6 to rotate in the bearing assembly 7 which is supported in the housing 8. The housing 8 supports the cover 9 and the shift lever 10. The shift lever 10 operates shift rails 11 and 12, which are slidably mounted in the abutments 13 and 14 of the cover 9. Each of the shift rails is provided with a detent of which detent 15 is shown engaging shift rail 12.

The shift rail 11 operates the clutch 16 while the shift rail 12 operates the clutch 17. The transmission, as shown, is a countershaft transmission in which the gear 5 drives gear 18 and gear 118 drives gear 4 depending upon the engagement of the clutch 16. The gear 19 drives the gear 20 and gear 21 drives gear 3. Gears 19 and 21 on the countershaft 22 are selectively engaged by the clutch 17.

FIGS. 2 and 3 are enlarged section views of the clutch 16. Gears 4 and 5 are selectively driven by the clutch 16. The shaft 2 is formed with a spline 23 which engages the mating spline 24 of the clutch hub 25. Gear 4 is formed with a hub 26 carrying the clutch teeth 27 for selective engagement with the clutch sleeve 28. The gear 5 is formed with a hub 29 and clutch teeth 30 for selective engagement with the clutch sleeve 28. A clutch hub 25 is formed with a recess 31 for selectively receiving either of the locking elements 32 or 33.

The clutch sleeve 28 is formed with radial openings 34 and 35 receiving the detent elements 32 and 33 permitting radial movement of the elements to and from the recess 31 as the sleeve 28 is shifted to the left or right. The locking ring 36 is formed with an annular recess 37 which receives the two detent elements 32 and 33. The locking ring 36 is operated by shift lever 10 reciprocating shift rail 11 for selective engagement with the snap rings 39 and 40.

FIG. 3 shows the engaged position of the clutch 16 in which the clutch hub 25 is engaged with the gear 4 and the clutch sleeve 28. As the locking ring 36 is moved to the right, the detent element 32 is allowed to drop within the recess 31 and lock the clutch sleeve 28 and clutch hub 25 together. The locking ring 36 has moved to engage the snap ring 40, and in this position, the detent element 32 is held in position by the locking ring which prevents relative axial motion between the clutch sleeve 28 and the clutch hub 25. In this position, the engagement of the gear 4 is positive and the clutch cannot be disengaged without manual movement of a locking ring 36.

FIGS. 4 and 5 show a modification in which clutch 17 selectively engages gears 3 and 20 with the shaft 2. Clutch hub 41 is formed with a mating spline 142 for engagement with the spline 23 of the shaft 2. The clutch hub 41 is formed with three recesses 42, 43 and 44. A single detent element 45 is selectively received in one of the three recesses 42, 43 and 44. FIG. 4 shows the neutral position of the clutch 17 in which the detent element is received in the center recess 43.

The clutch sleeve 46 is formed with a spline 47 which engages a mating spline 48 on a clutch hub 41. Locking ring 58 is formed with ramps 148, 49, 50 and 51 which selectively engage the detent element 45 to bias the detent element into one of the three recesses 42, 43, and 44. A clutch sleeve 46 carries the snap rings 52 and 53. Spring seat 54 engages the spring 55 while spring seat 56 engages the spring 57. The springs 55 and 57 bias the locking ring 58 to a neutral position in which the detent element 45 locks the clutch sleeve 46 and clutch hub 41 in the center position.

FIG. 5 shows the clutch 17 in the engaged position in which the gear 3 is connected to the clutch hub 41 by the clutch sleeve 46. The locking ring 58 is moved to the right-hand position biasing the clutch collar 46 to the right and to the engaged positioned as shown. When the locking ring 58 is released the locking ring becomes centered by the centering springs 55 and 57. The surface 63 of locking ring 58 locks the detent 45 in the recess 44 and clutch sleeve 46 is locked axially with the clutch hub 41. The clutch 17 cannot become disengaged until the locking ring 58 is moved from the position shown manually to allow the clutch to become disengaged. The annular recess 59 is adapted for receiving the shifter fork on shift rail 12 which is operated by the clutch lever 10 as shown in FIG. 1.

The operation of the device will be described in the following paragraphs.

The clutch 16 is shown in the neutral position as shown in FIG. 2 and when the clutch is engaged the shift lever 10 is pivoted to move the locking ring 16 axially. This in turn carries the clutch sleeve 28 axially until the clutch sleeve 28 is engaged with gear 4 or 5. When the gear is engaged, the clutch sleeve 28 is moved further axially until the detent element 32, for purpose of illustration, is received in the recess 31. As the detent element is forced downwardly in the recess 31 by the actuating ramp 60 and the locking ring 36 is permitted to move over the detent element 32 and thereby lock the clutch sleeve 28 and clutch hub 25 together. When the clutch is disengaged, the locking ring 36 is moved axially in the reverse direction allowing the detent element 32 to rise into the annular recess 37 and permit the clutch sleeve 28 to be disengaged from the clutch hub 25. The locking ring 36 is returned to the neutral position as shown. The ramp 61 is provided on the opposing side of the recess 37 for engagement of the gear 5 with the clutch hub 25 for locking of the clutch in the left-hand position.

The clutch 17 operates similarly by pivoting the lever 10 to selectively bias the shift rail 12 and its shift fork together with locking ring 58 in either direction. Biasing of the clutch locking ring 58 in the right-hand direction compresses the centering spring 55 allowing the detent element 45 to lift out of the recess 44. Continued movement of the locking ring 58 carries the clutch sleeve 46 in the right-hand direction until the clutch sleeve 46 and the clutch hub 41 are engaged with the gear 3. When the clutch is engaged, the locking ring 58 is then permitted to center its position on the clutch sleeve 46 and the position is shown in FIG. 5 and the surface 63 locks the detent element 45 in the locked position.

The detent element is permitted to raise into the annular recess 64 when the clutch collar is disengaged. The clutch 17 is locked in the clutch engaged position or the disengaged position as shown in FIGS. 5 and 4.

The embodiment of the invention in which an exclusive property or privilege is claimed are defined as follows:

1. A transmission clutch having a locking device comprising, a shaft, a clutch hub fixed to said shaft, a gear defining clutch teeth rotatably mounted on said shaft, a clutch sleeve slidably mounted on said clutch hub for selectively engaging said gear for connecting to said shaft, means defining a plurality of axially spaced recesses on said clutch hub, means defining radial openings angularly spaced in said clutch sleeve, at least one locking element in each of said openings of said sleeve, a locking ring embracing said clutch sleeve and defining ramp surfaces on its inner periphery formed by axially spaced notches and a central locking ridge for biasing said locking elements in said recesses of said clutch hub, centering springs biasing said locking ring to a centered position whereby said locking ridge locks said hub and said sleeve.

2. The transmission clutch having a locking device as set forth in claim 1, wherein said transmission includes at least two gears for selective engagement with said clutch sleeve.

3. A transmission clutch having a locking device as set forth in claim 1 including at least two gears for selective engagement with said clutch sleeve, said locking ridge of said locking ring defines at least two ramp surfaces for biasing said locking element to lock said clutch sleeve with said clutch hub.

4. A transmission clutch having a locking device as set forth in claim 1 including two gears for selective locking engagement by said clutch sleeve to said clutch hub, said locking ring defining at least two ramp surfaces defining each annular notch.

5. A transmission clutch having a locking device as set forth in claim 1 including at least two gears, said locking ring defines four ramps for biasing a locking element for locking said clutch sleeve to said clutch hub.

6. A transmission clutch having a locking device as set forth in claim 1 wherein said centering springs define coil springs for biasing said locking ring to a center position on said clutch collar.

7. A transmission clutch having a locking device as set forth in claim 1 wherein said shaft defines a spline, said clutch hub includes a mating spline received in said spline of said shaft, a spline on said clutch hub, a mating spline on said clutch sleeve for slideably moving said clutch sleeve on said clutch hub.

8. A transmission clutch having a locking device as set forth in claim 1 wherein said locking ring defines an internal spline, said clutch sleeve defines an external spline received in said spline of said of locking ring.

9. A transmission clutch having a locking device as set forth in claim 1 wherein said locking elements define balls.

10. A transmission clutch having a locking device as set forth in claim 1 wherein said hub defines three recesses.

* * * * *